United States Patent
Milicevic

(10) Patent No.: US 9,095,891 B2
(45) Date of Patent: Aug. 4, 2015

(54) METHOD OF ELIMINATING THE HEAT AFFECTED ZONE IN A WELDED CRANKSHAFT

(71) Applicant: Dusan Milicevic, Darien, IL (US)

(72) Inventor: Dusan Milicevic, Darien, IL (US)

( * ) Notice: Subject to any disclaimer, the term of this patent is extended or adjusted under 35 U.S.C. 154(b) by 283 days.

(21) Appl. No.: 13/772,517

(22) Filed: Feb. 21, 2013

(65) Prior Publication Data

US 2014/0230206 A1 Aug. 21, 2014

(51) Int. Cl.
| | |
|---|---|
| *B23P 17/00* | (2006.01) |
| *B21K 1/08* | (2006.01) |
| *F16C 3/10* | (2006.01) |
| *B23K 31/00* | (2006.01) |

(52) U.S. Cl.
CPC ............... *B21K 1/08* (2013.01); *B23K 31/003* (2013.01); *F16C 3/10* (2013.01); *B23K 2201/005* (2013.01); *B23K 2201/006* (2013.01); *Y10T 29/17* (2015.01); *Y10T 29/49286* (2015.01)

(58) Field of Classification Search
CPC .. B21K 1/08; B23K 31/003; B23K 2201/005; Y10T 29/17; Y10T 29/49286; F16C 3/10
See application file for complete search history.

(56) References Cited

U.S. PATENT DOCUMENTS

| | | | |
|---|---|---|---|
| 2,378,686 A | 6/1945 | Carstens | |
| 2,403,049 A | 7/1946 | Carstens | |
| 2,472,261 A | 6/1949 | Mueller | |
| 2,583,362 A | 1/1952 | Dunn | |
| 2,678,370 A | 5/1954 | Denneen | |
| 2,741,932 A | 4/1956 | Whitney et al. | |
| 2,743,500 A | 5/1956 | Berg | |
| 2,800,809 A | 7/1957 | Pike | |
| 3,101,165 A | 8/1963 | Barkley et al. | |
| 3,108,913 A | 10/1963 | Sommer | |
| 3,144,702 A | 8/1964 | Wuppermann | |
| 3,191,744 A | 6/1965 | Schmid et al. | |
| 3,257,865 A | 6/1966 | Seulen et al. | |
| 3,272,954 A | 9/1966 | Seulen et al. | |
| 3,411,380 A | 11/1968 | Ehl et al. | |
| 3,623,128 A | 11/1971 | Seulen et al. | |
| 3,650,143 A * | 3/1972 | Ruget | 72/412 |
| 3,688,552 A * | 9/1972 | Ruget | 72/402 |
| 3,784,780 A | 1/1974 | Laughlin et al. | |
| 3,867,832 A * | 2/1975 | Rut | 72/399 |
| 3,914,572 A | 10/1975 | Jensen | |
| 3,924,439 A | 12/1975 | Poncin | |
| 4,008,927 A | 2/1977 | Mayer | |
| 4,554,893 A | 11/1985 | Vecellio | |
| 4,886,023 A | 12/1989 | Werner et al. | |
| 5,009,001 A | 4/1991 | Deschler | |
| 5,115,663 A | 5/1992 | Ando et al. | |
| 5,157,231 A | 10/1992 | Baeuerle et al. | |
| 5,237,892 A * | 8/1993 | Fry | 74/603 |

(Continued)

*Primary Examiner* — Ryan J Walters
(74) *Attorney, Agent, or Firm* — The Webb Law Firm

(57) ABSTRACT

A method of manufacturing a crankshaft comprising providing two parts, each part comprising two webs, a portion of a crank journal and a portion of a main journal, welding the two portions of the crank journal together, heating the crank journal, inserting a shim between the webs, and upset forging to reduce the length of the crank journal to form a forged segment. Alternatively, the portions of the main journal may be welded, heated, shimmed, and forged to form a forged segment. The crankshaft may be lengthened by adding additional parts or forged segments using the same steps. A production line for carrying out this method when producing a crankshaft with n number of crank journals, where n is an even integer.

15 Claims, 5 Drawing Sheets

(56) References Cited

U.S. PATENT DOCUMENTS

| | | |
|---|---|---|
| 5,303,468 A | 4/1994 | Cieszkiewicz et al. |
| 6,013,904 A | 1/2000 | Storm et al. |
| 6,140,625 A | 10/2000 | Gezarzick et al. |
| 6,160,247 A | 12/2000 | Storm et al. |
| 6,160,248 A | 12/2000 | Ottenwaelder et al. |
| 6,274,857 B1 | 8/2001 | Loveless et al. |
| 6,378,396 B1 | 4/2002 | Reinhardt et al. |
| 6,555,800 B1 | 4/2003 | Zahn |
| 6,638,379 B1 | 10/2003 | Schulte et al. |
| 7,145,115 B2 | 12/2006 | Zahn et al. |
| 7,371,988 B2 | 5/2008 | Coleman et al. |
| 7,501,606 B2 | 3/2009 | Zahn et al. |
| 8,215,883 B2 | 7/2012 | Suzuki |
| 8,222,577 B2 | 7/2012 | Gustafsson et al. |
| 8,249,749 B2 | 8/2012 | Dage et al. |
| 2002/0040619 A1 | 4/2002 | Hatton |
| 2003/0221514 A1 | 12/2003 | Amborn |
| 2006/0086708 A1 | 4/2006 | Coleman et al. |
| 2006/0191878 A1 | 8/2006 | Stol et al. |
| 2008/0041844 A1 | 2/2008 | Akers et al. |
| 2008/0237304 A1 | 10/2008 | Bridges et al. |
| 2009/0308501 A1 | 12/2009 | Illencik et al. |
| 2010/0139451 A1 | 6/2010 | Saito et al. |
| 2010/0146753 A1 | 6/2010 | Reeb et al. |
| 2011/0132138 A1 | 6/2011 | Saito et al. |
| 2012/0192999 A1 | 8/2012 | Khan et al. |

\* cited by examiner

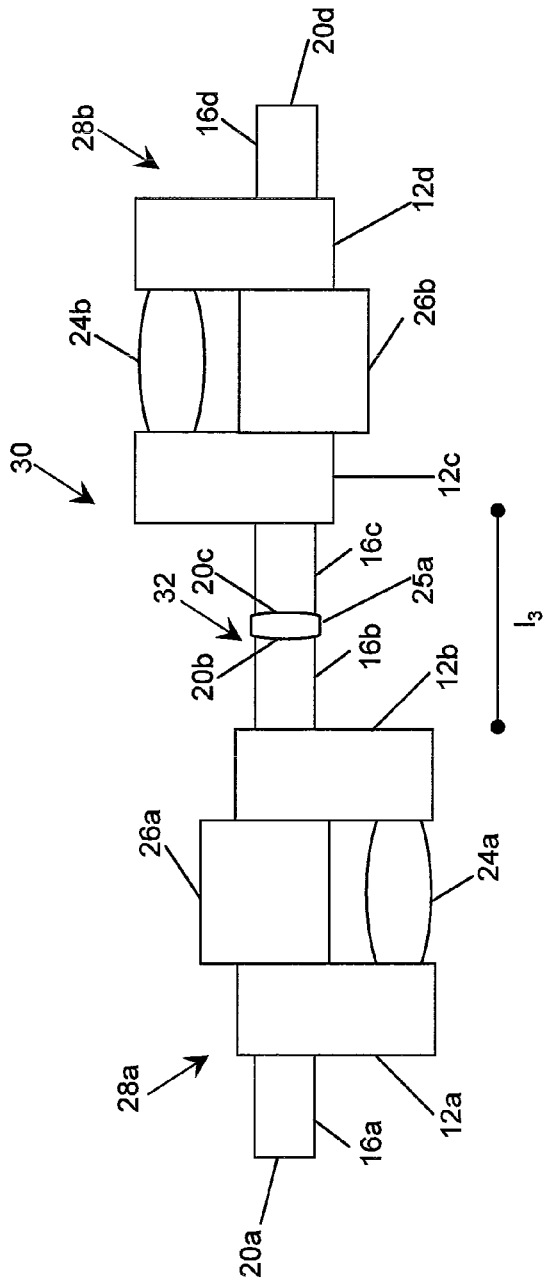
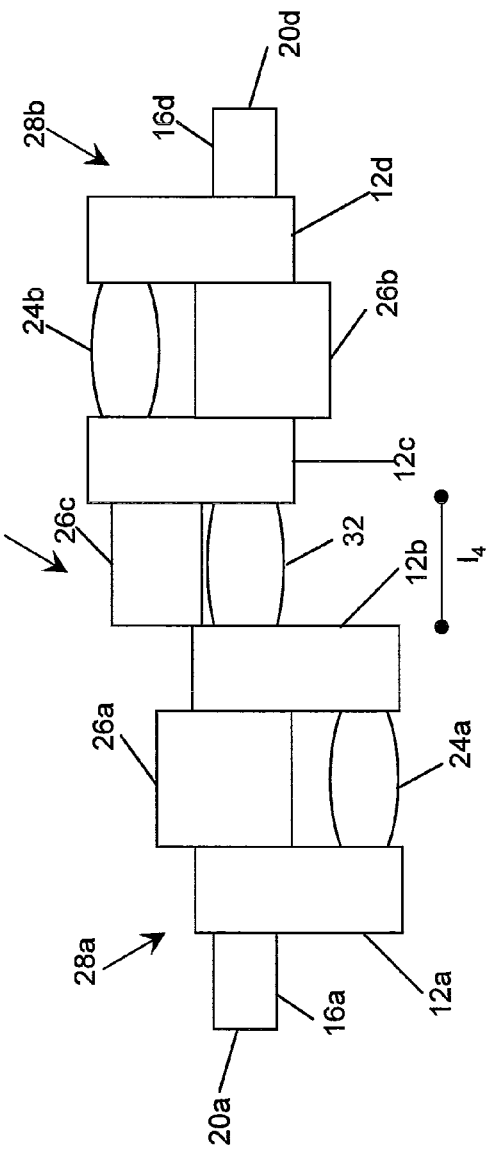

METHOD OF ELIMINATING THE HEAT AFFECTED ZONE IN A WELDED CRANKSHAFT

BACKGROUND OF THE INVENTION

1. Field of the Invention

The present invention relates to a method for producing a welded crankshaft having a plurality of individual parts and a production line for carrying out the method. The welded crankshaft has no heat-affected zone (HAZ) in the sections that were welded and little or no dimensional distortion such that the welded crankshaft has substantially similar or improved mechanical and impact properties as a solid crankshaft.

2. Description of Related Art

Crankshafts may be manufactured from a plurality of component parts that are welded together. Generally, the welding occurs between the ends of the journal and the web, or within the journals themselves. As is known in the art, the heat from the welding process creates a HAZ in the basis metal in the area adjacent to the weld. The creation of this HAZ has adverse metallurgical effects on the basis metal and, thus the welded component. Such effects include the creation of notch effects and/or grain reduction in impact properties, which cause a weakening of the metal in the HAZ. This can lead to failures that limit the useful life of the welded crankshaft. Post-weld heat treatment (PWHT) has been used to eliminate the HAZ. However, PWHT can lead to deformation and dimensional distortion of the finished product.

Several patents have been directed to welded crankshafts and welding processes that reduce or eliminate the HAZ.

U.S. Pat. No. 2,403,049 is directed to a method of making crankshafts by welding together forged components comprising a web with a stub on each side. The stubs of multiple components are electric welded together followed by a stress-relieving heat treatment where the crankshaft is placed in a complicated jig to reduce dimensional distortion.

U.S. Pat. No. 2,583,362 is directed to a method and apparatus for induction or pressure butt welding components of a crankshaft in a protective atmosphere to prevent oxidization and cause carburization of the welded surfaces. Based on the described method, the metallurgical quality of the crankshaft would be closer to a cast crankshaft than a wholly forged crankshaft.

U.S. Pat. No. 2,678,370 is directed to a method and means for heating metallic objects to an even and uniform welding temperature prior to pressure butt welding. The method uses electrical currents to provide heating in areas remote from an external heating source. The electrical currents take advantage of the variation in the resistivity of the metal as a function of temperature to uniformly heat the metallic object in the areas where the convective heating from the external source is reduced.

U.S. Pat. No. 3,144,702 is directed to method for a manufacturing a crankshaft using components comprising a web with a pin shaped extension on each side. A tube of wear-resistant material is placed over the pins and the corresponding pins on two components are welded together, preferably by flash butt welding.

U.S. Pat. No. 4,008,927 is directed to a welded crankshaft manufactured from components having a crankshaft section having an end face and a main shaft journal section having an end face. The end faces of the crankshaft sections of the components and the main shaft sections of the components are electron beam welded together after centering pins have been placed in the end faces of the sections to align them for welding.

U.S. Pat. No. 5,303,468 is directed to a welded crankshaft where tubular journals are electron beam welded at their ends to a web. An angled surface on the end of the journal and a corresponding groove in the web facilitate the electron beam welding process. The HAZ created by electron beam welding is expected to be smaller than the HAZ created by induction or other welding methods, but not eliminated.

U.S. Pat. No. 6,378,396 describes a crankshaft manufactured from individual components having a web with tubular segments disposed on each side. The tubular segments are friction welded together to form the crankshaft.

United States Patent Application Publication No. 2006/0086708 is directed to a method for welding together two metallic pieces in order to eliminate the need for PWHT after welding to eliminate the HAZ. The method comprises overlay welding the surfaces to be joined with a nickel-based filler metal, heat treating to eliminate or temper the HAZ created by the overlay welding process, and then welding the overlaid surfaces of the two metallic pieces together using a nickel-based filler metal.

United States Patent Application Publication No. 2006/0191878 is directed to a welding method where the surfaces to be welded are plastically deformed and then machined prior to welding.

None of this prior art provides a method for manufacturing a welded crankshaft having no HAZ without the use of a PWHT that can cause distortion. It has been found that by upset forging the welded portion of the crankshaft, the HAZ is eliminated and little or no distortion of the resulting crankshaft section occurs.

SUMMARY OF THE INVENTION

The present invention is directed to a method of manufacturing a crankshaft comprising several steps. Two parts are provided, each part comprising a web, a portion of a crank journal on one side of the web and a portion of a main journal on the other side of the web. The two portions of the crank journal are welded together to form a segment comprising two webs, a crank journal, and two portions of a main journal. The crank journal is then heated. Following heating, a shim is inserted between the webs of the segment and the segment is upset forged to reduce the length of the crank journal and create a forged segment. Prior to forging, the crank journal may be longer than the crank journal of the finished crankshaft.

The method may further comprise increasing the overall length of the forged segment by adding an additional part to the forged segment. The addition is made by welding a portion of the main journal of the forged segment and a corresponding portion of the main journal of the part to form a component having a welded journal. The welded journal is then heated. After heating, a shim is inserted in the space created between the webs bounding the welded journal, and the component is upset forged to reduce the length of the welded journal and create a forged component.

Additionally, the method may include providing a first forged segment and a second forged segment. A main journal portion of the first forged segment is welded to a main journal portion of the second forged segment to form a section comprising four webs, two crank journals, a main journal, and two portions of a main journal. The main journal is heated. After heating, a shim is inserted in the space created between the webs bounding the main journal and the section is upset forged to reduce the length of the main journal and create a forged section.

Alternatively, the main journal portions of the parts are welded, heated, shimmed, and forged to form a forged segment comprising two webs, a main journal, and two portions of a crank journal and then a portion of a crank journal of an additional part or a second segment are welded, heated, shimmed, and forged to form a forged component or forged section, respectively.

The overall length of the crankshaft may be increased by adding another part to the forged section, forged segment, or an additional forged section. The addition is made by welding a portion of either the crank journal or main journal of the section to a corresponding portion of either the crank journal or the main journal of the part, forged segment or additional forged section to form a welded journal. The welded journal is heated. After heating, a shim is inserted in the space created between the webs bounding the welded journal and the component is upset forged to reduce the length of the welded journal.

A production line for carrying out this method when producing a crankshaft with n number of crank journals and n−1 main journals or n number of main journals and n−1 crank journals, where n is an even integer, comprises a first section comprising n welding stations, heating stations, and upset forging stations. Each consecutive section thereafter comprises half as many welding stations, heating stations, and upset forging stations as the previous section. The total number of sections, x, is determined by $n=2^{x-1}$. 2n separate crankshaft pieces enter the first section and half as many pieces enter each consecutive section thereafter. In each section of the line, components of the crankshaft pass through a welding station followed by a heating station followed by an upset-forging station in the production direction of the line. An additional section having a welding station, heating station and upset forging station may be placed after the last section of the line.

BRIEF DESCRIPTION OF THE DRAWINGS

FIG. 4 shows a side view of a section of a crankshaft after welding two forged segments together according to one embodiment of the inventive method.

FIG. 5 shows a side view of a forged section of a crankshaft according to one embodiment of the inventive method.

BRIEF DESCRIPTION OF THE INVENTION

A method is provided for manufacturing welded crankshafts having a HAZ in the welded portions and minimal distortion.

Figure 1:
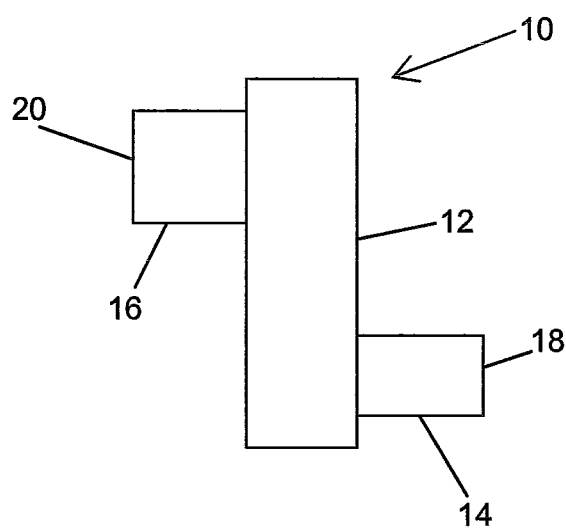
FIG. 1 shows a side view of a part provided according one embodiment of the inventive method.

Two parts each comprising a web, a portion of a crank journal on one side of the web and a portion of a main journal on the other side of the web are provided. The parts may be precision forged or machined according to known methods. The parts may be comprised of any known alloy suitable for manufacturing a crankshaft, including, but not limited to, AISI 4340, AISI 4140, or AISI 4340 modified with Vanadium. FIG. 1 shows a part (10). The web (12) has a portion of a crank journal (14) on one side. The portion of the crank journal (14) can have a cylindrical or conical shape. The length of the portion of the crank journal (14) may be longer than half of the length of a crank journal of the finished crankshaft. Preferably, the portion of the crank journal (14) is at least 5-35% longer than half the length of the crank journal of the finished crankshaft and more preferably 20% longer than half the length of the crank journal of the finished crankshaft. The web (12) also has a portion of a main journal (16) on the side opposite the portion of the crank journal (14). The portion of the main journal (16) can have a cylindrical or conical shape. The length of the portion of the main journal (16) may be longer than half the length of a main journal of the finished crankshaft. Preferably, the portion of the main journal (16) is at least 5-35% longer than half the length of the main journal and, more preferably, 20% longer than half the length of the main journal of the finished crankshaft. A welding surface (18) is located on the end of the portion of the crank journal (14) and a welding surface (20) is located on the end of the portion of the main journal (16). The welding surfaces (18, 20) may be machined before welding.

Figure 2:
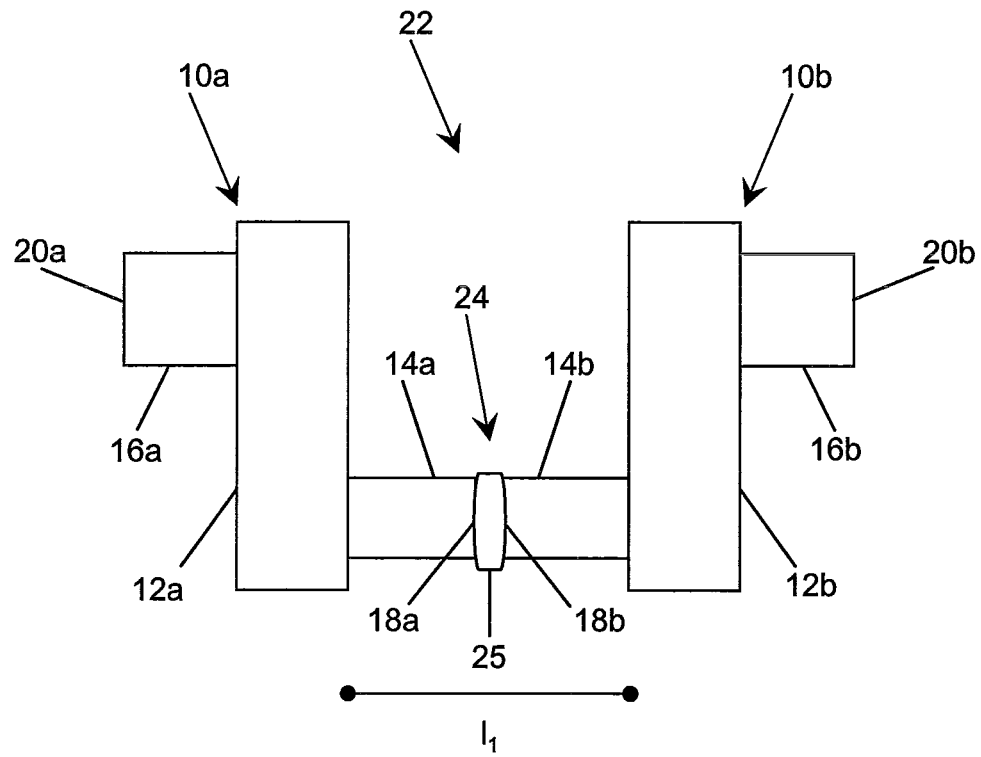
FIG. 2 shows a side view of a segment of a crankshaft after welding two parts together according to one embodiment of the inventive method.

As shown in FIG. 2, the corresponding welding surfaces (18a, 18b) of the portions of the crank journal (14a, 14b) are welded together using any conventional welding process including, but not limited to, friction welding, induction welding, or arc welding. This welding step creates a segment (22) comprising two webs (12a, 12b), a crank journal (24), and two main journal portions (16a, 16b). The web (12a) located on one side of the segment (22) may be identical in shape and size to the web (12b) located on the other side of the segment (22). The crank journal (24) of the segment (22) may have a generally cylindrical shape and has a length ($l_1$) that is longer than the crank journal of the finished crankshaft. The weld (25) may be placed in the center of the crank journal (24) or may be placed at any location along the crank journal (24).

When the welding is completed, the segment (22) is removed from the welding station and the crank journal (24) is heated in preparation for upset forging. This heating may be done by any conventional means including, but not limited to, induction heating or gas furnace heating.

The crank journal (24) is heated to a temperature of 1500° F.-1950° F.

After heating, a shim (26) is placed between the two webs (12a, 12b) and the segment (22) is upset forged to reduce the length of the crank journal (24) and create a forged segment (28). The upset forging is conducted along a longitudinal axis of the crank journal (24). Required pressing force during upset forging is a function of the diameter of the main or crank journal (24) and hot workability of the metal. For example, crank or main journal having a 2 inch diameter requires a maximum pressing force of less than 300 tons. In general, the shape of the dies resembles the shape of the web (12a, 12b) and has an opening for the crank journal (24). The welded segment (22) is placed between the two dies, one of which may be stationary and the other may be movable. The movable die is pushed toward the stationary die, thereby creating an upset force along the longitudinal axis of the crank or main journal.

Figure 3:
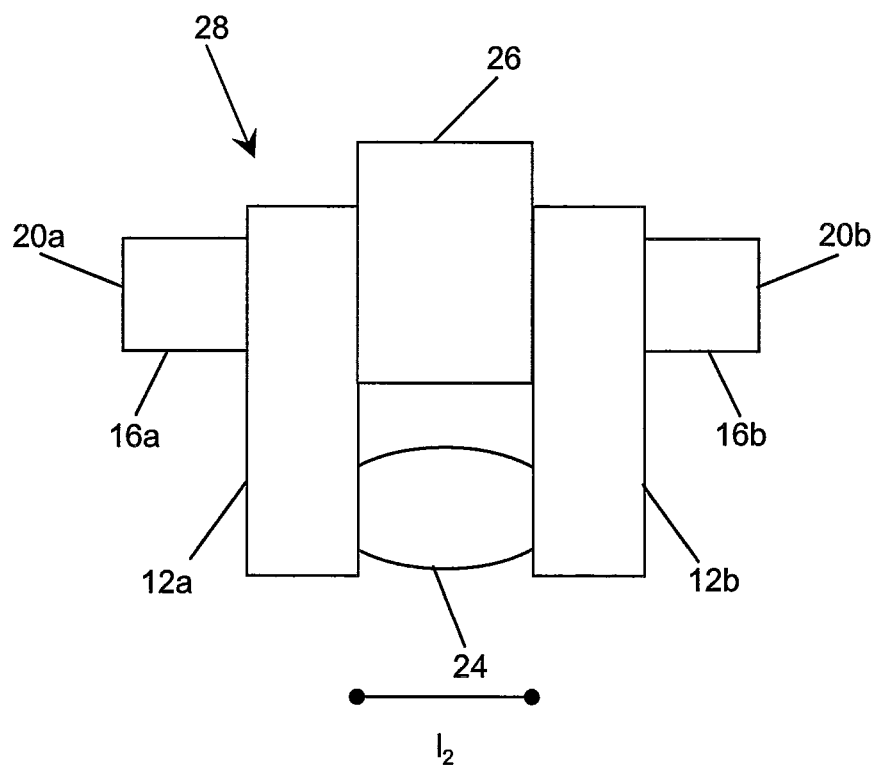
FIG. 3 shows a side view of a forged segment of a crankshaft according to one embodiment of the inventive method.

FIG. 3 shows the forged segment (28). The final length ($l_2$) of the crank journal (24) is determined by the length of the shim (26). Preferably, the length of the shim is equal to the desired finished length of the crank journal (24) such that the initial length ($l_1$) is reduced to a final length ($l_2$).

After upset forging, the crank journal (24) will have a barrel shape. The excess material may be removed by machining.

The finished forged segment (28) is stress relieved and any HAZ created during the welding process is eliminated.

The overall length of the forged segment (28) may be increased by successively welding, heating, shimming, and forging additional parts onto the ends of the forged segment (28) in the manner described above.

Alternatively, two forged segments (28a, 28b) may then be connected together is a similar manner (FIG. 4). Each forged segment (28a, 28b) comprises two webs (12a-12d), a crank journal (24a, 24b), and two portions of a main journal (16a-16d) as shown in FIG. 3. The two segments (28a, 28b) may be identical in size and/or shape.

Corresponding welding surfaces (20b, 20c) of the portions of the main journal (16b, 16c) are welded together using any conventional welding process including, but not limited to, friction welding, induction welding, or arc welding. The welding process of the portions of the main journal (16b, 16c) may be identical to the welding process of the portions of the crank journal (14a, 14b). This welding step creates a section (30) comprising four webs (12a-12d), two crank journals (24a, 24b), a main journal (32) and two main journal portions (16a, 16d). The main journal (32) of the section (30) may have a generally cylindrical shape and has a length ($l_3$) that is longer than the main journal of the finished crankshaft. The weld may be placed in the center of the main journal (32) and the two segments may be welded such that the webs (12a, 12b) of the first segment (28a) and the webs (12c, 12d) of the second segment (28b) are parallel or at an angle relative to one another as is required by the crankshaft design.

When the welding is completed, the section (30) is removed from the welding station and the main journal (32) is heated in preparation for upset forging. This heating may be done by any conventional means including, but not limited to, induction heating or gas furnace heating.

The main journal (32) is heated to a temperature of 1500° F.-1950° F.

After heating, a shim (26c) is placed in the space between the two webs (12b, 12c) bounding the main journal (32). Thus, the overall shape of the two segments (28a, 28b) and three shims (26a-26c) resembles a solid bar or billet with portions of a main journal (16a, 16d) at the ends.

After inserting the shim (26c), the section (30) is upset forged to reduce the length of the main journal (32).

FIG. 5 shows the forged section (34). The final length ($l_4$) of the main journal (32) is determined by the length of the shim (26c). Preferably, the length of the shim (26c) is equal to the desired finished length of the main journal (32). After upset forging, the main journal (32) will have a barrel shape. The excess material may be removed by machining.

Alternatively, the main journal portions of the parts may be welded, heated, shimmed, and forged as described above to form a forged segment comprising two webs, a main journal, and two portions of a crank journal and the portions of the crank journal of two forged segments may then be welded, heated, shimmed, and forged as described above to form a forged section comprising four webs, a crank journal, two main journals, and two portions of a crank journal.

The overall length of the crankshaft may be increased by adding to the forged section another part, forged segment, or an additional forged section. The addition is made by welding a portion of either a crank journal or main journal of the section and a corresponding portion of either a crank journal or main journal of the part, forged segment or additional forged section to form a welded journal, heating the welded journal, inserting a shim in the space created between the webs bounding the welded journal, and upset forging the component to reduce the length of the welded journal. The welding, heating, shimming, and forging are carried out as described above.

Figure 6:
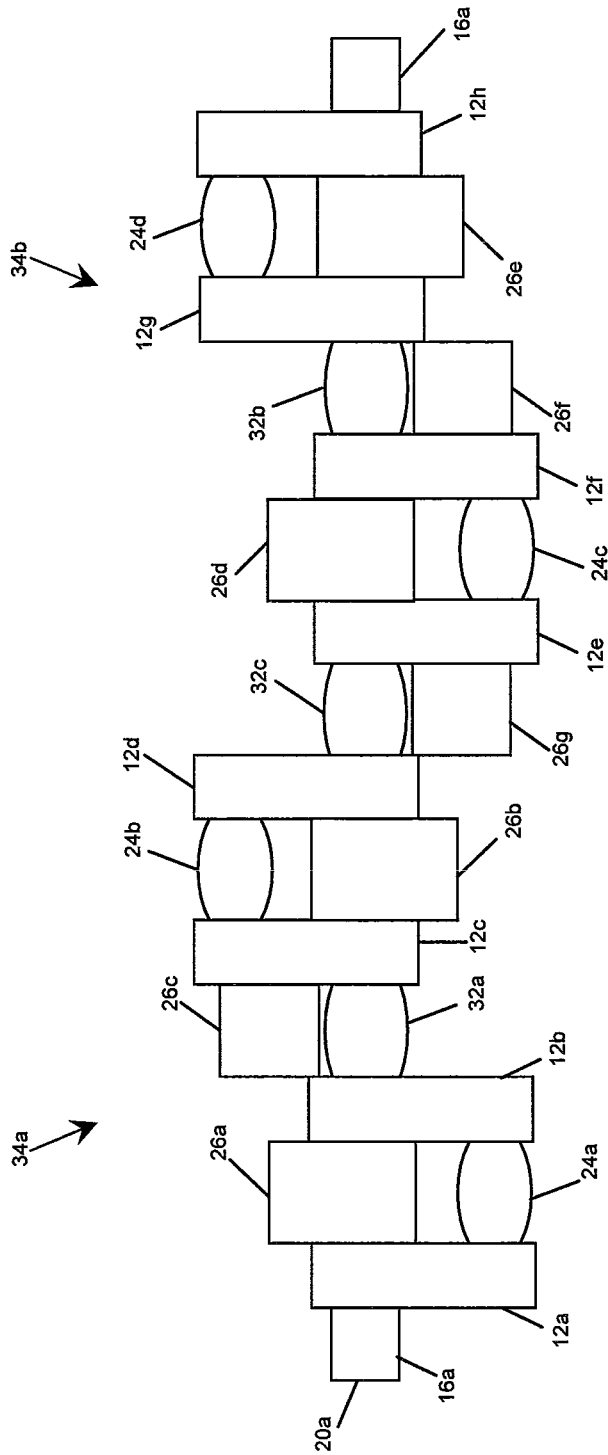
FIG. 6 shows a side view of a lengthened section of a crankshaft wherein two sections were welded, heated, shimmed, and forged according to one embodiment of the inventive method.

For example, as shown in FIG. 6, two forged sections (34a, 34b) each comprising two segments and, thus having four webs (12a-12h), two crank journals (24a-24d), a main journal (32a, 32b) and two main journal portions (16a, 16d, 16e, 16h) can be connected by welding a main journal portion of the first section (34a) to a main journal portion of the second section (34b) to create a third main journal (32c), heating the third main journal (32c), inserting a shim (26g) between the webs (12d, 12e) defining the third main journal (32c) and upset forging the resulting component to reduce the length of the third main journal (32c). This results in a crankshaft with four crankshaft journals (24a-24d). The third main journal (32c) can be upset because of the shims (26a-26g).

In all of the embodiments of the inventive method described above, the shims are removed after the final forging step and the forged journals are machined. The finished crankshaft has uniform microstructure in the region of each weld (25). While all of the embodiments shown in FIGS. 1-6, utilize a single uniform part having portions of the crank shaft and main shaft sized such that the weld is placed in the center of the crank journal and the main journal, it should be understood that length of the portions of the crank journal and the main journal may be sized in any fashion such that the weld may be placed at any point across the length of the journal. When two portions of a journal are welded together, the lengths of the two portions do not have to be the same. However, the total length of the portions need to account for the reduction taken during the forging step in order to obtain the desired finish length of the journal.

Now, a high volume production line for producing a crankshaft according to the inventive method will be described. A production line for producing a crankshaft with n number of crank journals and n−1 main journals or n number of main journals and n−1 crank journals, where n is an even integer, will comprise a first section comprising n welding stations, heating stations, and upset forging stations. Each consecutive section thereafter comprises half as many welding stations, heating stations, and upset forging stations as the previous section, wherein the total number of sections, x, is determined by $n=2^{x-1}$. 2n separate crankshaft pieces enter the first section and half as many pieces enter each consecutive section thereafter. In each section of the line, components of the crankshaft pass through a welding station followed by a heating station followed by an upset forging station in the production direction of the line. An additional section having a welding station, heating station and upset forging station may be placed after the last section of the line or may be provided as a separate mini-line for welding and upset forging the ends of the crankshaft.

Figure 7:
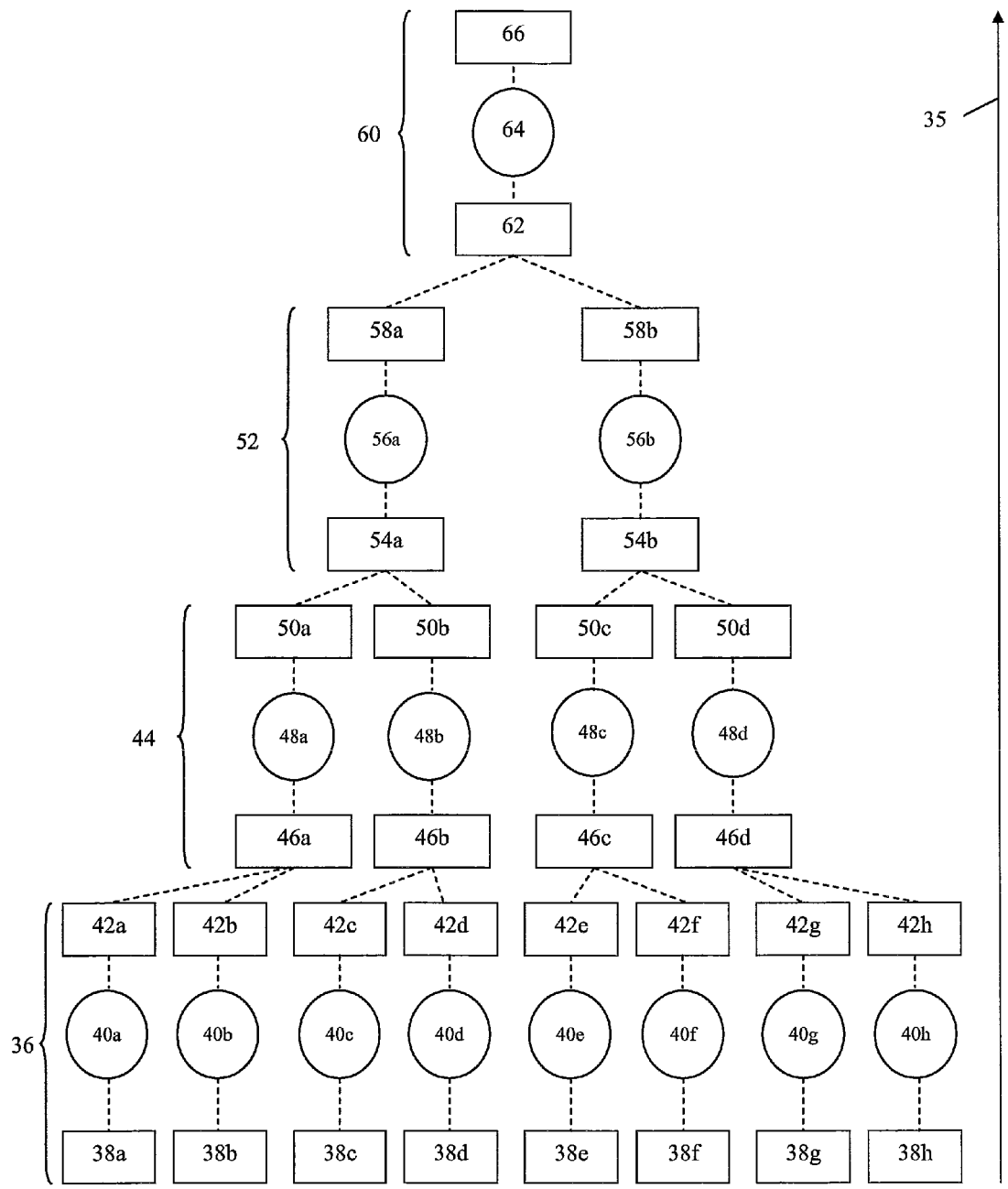
FIG. 7 shows a schematic diagram of a production line for producing crankshafts according to one embodiment of the inventive method.

While FIG. 7 shows a schematic of an example high volume crankshaft production line for a crankshaft having eight crank journals, i.e., eight segments, the present invention provides a method of welding any number and any size of segments, sections, and/or components and is not limited to an eight segment crankshaft. The arrow (35) in FIG. 7 represents the direction in which the crankshaft components will move through the line.

In the first section (36) of the line, two parts enter each of eight welding stations (38a-38h) with each welding station producing one segment comprising two webs, one crank journal, and two portions of a main journal. After welding, each segment is moved to one of eight induction heating stations (40a-40h) to heat the crank journal of that segment. After heating is completed, each segment is moved to one of eight upset forging stations (42a-42h) where the shim is placed in the segment and the segment is upset forged to reduce the length of the crank journal.

In the second section (44) of the line, two forged segments are then moved to each of four main journal welding stations (46a-46d) where the corresponding main journal portions of the segments are welded together to form sections. After welding, each section is moved to one of four induction heating stations (48a-48d) to heat the main journal of that section. After heating is completed, each section is moved to one of four upset forging stations (50a-50d) where the shim is placed in the section and the section is upset forged to reduce the length of the main journal. At this point, four sections of the crankshaft, each consisting of two segments are formed.

In the third station (52) of the line, two forged sections are then moved to each of two main journal welding stations (54a, 54b) where the corresponding main journal portions of the segments are welded together to lengthen the crankshaft. After welding, each lengthened section is moved to one of two induction heating stations (56a, 56b) to heat the recently welded main journal of that lengthened section. After heating is completed, each lengthened section is moved to one of two upset forging stations (58a, 58b) where the shim is placed in the lengthened section and the lengthened section is upset forged to reduce the length of the most newly formed main journal.

In the last section (60), the two lengthened sections are moved to a final main journal welding station (62) where the corresponding main journal portions of the lengthened sections are welded together to form the crankshaft. After welding, the crankshaft is moved to the final induction heating station (64) to heat the most recently welded main journal. After heating is completed, the crankshaft is moved to the final upset forging station (66) where the shim is placed in the crankshaft and the crankshaft is upset forged to reduce length of the most recently welded main journal.

Using such a production line, a minimum of two crankshafts can be produced per minute.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this specification. For example, it is to be understood that the present invention contemplates that, to the extent possible, one or more features of any embodiment can be combined with one or more features of any other embodiment.

The invention claimed is:

1. A method of manufacturing a crankshaft comprising steps of:
   providing two parts, each part comprising a web, a portion of a crank journal on one side of the web and a portion of a main journal on the opposing side of the web;
   welding the two portions of the crank journal together to form a segment comprising two webs, a crank journal, and two portions of a main journal;
   heating the crank journal;
   inserting a shim between the webs of the segment; and
   upset forging the segment to reduce a length of the crank journal and create a first forged segment.

2. The method according to claim 1, wherein, prior to forging, the crank journal is longer than a crank journal of a finished crankshaft.

3. The method according to claim 1, wherein the portion of the crank journal, the portion of the main journal, or both are longer than half the length of a crank journal and a main journal of a finished crankshaft, respectively.

4. The method according to claim 1, wherein the portion of the crank journal, the portion of the main journal, or both are 5-35% longer than half the length of a crank journal and a main journal of a finished crankshaft, respectively.

5. The method according to claim 1, wherein the shim has a length equal to the length of the crank journal of the crankshaft.

6. The method according to claim 1, wherein the welding is one of induction welding, friction welding, or arc welding.

7. The method according to claim 1, wherein the heating is done by induction heating or gas furnace heating.

8. The method according to claim 1, wherein heating is carried out at a temperature of 1650-1900° F.

9. The method according to claim 1, further comprising:
   increasing the overall length of the first forged segment by adding to the first forged segment an additional part wherein the addition is made by:
   welding the portion of the main journal of the first forged segment and a corresponding portion of a main journal of the additional part to form a component having a welded main journal,
   heating the welded main journal,
   inserting a shim in a space created between webs bounding the welded main journal, and
   upset forging the component to reduce the length of a welded main journal and create a second forged component.

10. The method according to claim 9, wherein, prior to forging, the main journal is longer than a main journal of a finished crankshaft.

11. The method according to claim 1, further comprising:
   providing the first forged segment and at least a second forged segment,
   welding a main journal portion of the first forged segment to a main journal portion of the second forged segment to form a section comprising four webs, two crank journals, a main journal, and two portions of a main journal,
   heating the main journal,
   inserting a shim in a space created between webs bounding the main journal, and
   upset forging the section to reduce the length of the main journal and create a forged section.

12. The method according to claim 11, further comprising:
   increasing the overall length of the crankshaft by adding to the forged section another part, forged segment, or an additional forged section wherein the addition is made by:
   welding a portion of the main journal of the forged section and a corresponding portion of the main journal of the part, forged segment or additional forged section to form a component having a welded journal,
   heating the welded journal,
   inserting a shim in a space created between the bounding the welded journal, and
   upset forging the component to reduce the length of the welded journal.

13. The method according to claim 11, further comprising:
   increasing the overall length of the crankshaft by adding another part, forged segment, or an additional forged section to the forged section wherein the addition is made by:
   welding a portion of the crank journal of the forged section and a corresponding portion of the crank journal of the part, forged segment, or additional forged section to form a component having a welded journal,
   heating the welded journal,
   inserting a shim in a space created between webs bounding the welded journal, and
   upset forging the component to reduce the length of the welded journal.

14. The method according to claim 11, wherein the crankshaft has improved mechanical and impact properties.

15. A method of manufacturing a crankshaft comprising steps of:
- providing two parts, each part comprising a web, a portion of a crank journal on one side of the web and a portion of a main journal on the opposing side of the web:
- welding the two portions of the main journal together to form a segment comprising two webs, a main journal, and two portions of a crank journal;
- heating the main journal;
- inserting a shim between the webs of the segment; and
- upset forging the segment to reduce a length of the main journal and create a forged segment.

\* \* \* \* \*